United States Patent [19]
Poulson

[11] Patent Number: 5,803,016
[45] Date of Patent: Sep. 8, 1998

[54] CLEANABLE WASTE DEPOSITORY FOR SMALL ANIMALS AND METHOD

[76] Inventor: T. Earl Poulson, 22 Elmwood Dr., Indian Head Park, Ill. 60525

[21] Appl. No.: 527,472

[22] Filed: Sep. 13, 1995

[51] Int. Cl.[6] ................................................. A01K 29/00
[52] U.S. Cl. ........................................... 119/161; 119/162
[58] Field of Search .................................... 119/161, 162, 119/165, 166

[56] References Cited

U.S. PATENT DOCUMENTS

| | | | |
|---|---|---|---|
| 2,684,051 | 7/1954 | Leblond et al. | 119/17 |
| 3,227,139 | 1/1966 | Gass et al. | 119/17 |
| 3,228,375 | 1/1966 | Philippe | 119/17 |
| 3,688,741 | 9/1972 | Thompson et al. | 119/165 |
| 3,742,908 | 7/1973 | Merino | 119/15 |
| 3,890,931 | 6/1975 | Saver | 119/161 |
| 3,990,397 | 11/1976 | Lowe | 119/165 |
| 4,154,196 | 5/1979 | Gass | 119/17 |
| 4,627,383 | 12/1986 | Metzger | 119/161 |
| 5,341,763 | 8/1994 | Bondurant | 119/166 |

FOREIGN PATENT DOCUMENTS

| | | | |
|---|---|---|---|
| 2625957 | 12/1977 | Germany | 119/166 |
| 689018 | 3/1953 | United Kingdom . | |
| 1427201 | 3/1976 | United Kingdom . | |

Primary Examiner—Edgar S. Burr
Assistant Examiner—Anthony H. Nguyen
Attorney, Agent, or Firm—Jenner & Block

[57] ABSTRACT

A surface portion (104, 204) is accessible to a small animal within the confines of the animal's habitat. The surface portion (104, 204) may be an integral part of the animal's habitat, such as a tubular member (100) of an animal run. Alternatively, the surface portion (204) may be a part of a stand alone waste depository (200) that is added to the animal's habitat. The container (110, 210) is preferably removably mounted under an opening (106, 206) in the surface portion (104, 204) such that an opening (114, 214) in the container and the opening (106, 206) in the surface portion (104, 204) form a channel for receiving bodily excrement from the small animal when the small animal is on the surface portion (104, 204). The channel directs the bodily excrement to the container (110, 210) below the surface portion (104, 204). Ventilation (112, 212) is provided to dry the waste and divert odors from the waste from the small animal's general living area.

12 Claims, 2 Drawing Sheets

CLEANABLE WASTE DEPOSITORY FOR SMALL ANIMALS AND METHOD

FIELD OF THE INVENTION

This invention relates to waste depositories for small animals, such as gerbils, hamsters, mice and the like, and in particular, to a waste depository into which small animals will deposit their waste products to maintain a clean living environment.

BACKGROUND OF THE INVENTION

Hobbyists often maintain small animals, such as gerbils, hamsters, mice and the like, in confined animal habitats where the hobbyists can enjoy observing and interacting with the small animals and the small animals can enjoy a comfortable living environment. To provide the highest level of comfort to the small animal, the animal habitat is designed to simulate the natural environment of the animal, including an ample supply of food and water, adequate materials for bedding and burrowing, adequate space and facilities for exercise, suitable companionship, and some provisions for expelling bodily waste.

Though there have been various advances for providing apparatus for burrowing, bedding, exercising and feeding of the small animal, suitable provisions for the disposal of, and handling of, the small animal's waste have not been provided. In conventional animal habitats, the animal is confined by walls extending upward from a generally foranimous or perforate bottom. To facilitate bodily waste disposal, the foranimous bottom of the cage is configured to allow the small animal to support himself on the bottom of the cage yet readily permit the flow of liquid and solid waste directly from the animal through the foranimous bottom to a removable tray situated under the habitat. The small animal's caretaker, not to be confused with the original hobbyist that gets enjoyment out of the small animal, is left with the task of removing the tray of liquid and solid waste products for disposal. Unfortunately, this arrangement is not terribly desirable for either the small animal or the caretaker. The small animal is forced to live on top of his debris while the foranimous bottom does nothing to prevent the odor from the animal's waste products from invading the general living space of the small animal. The caretaker is left with the arduous task of removing and cleaning the tray of waste, while trying to avoid touching, seeing and smelling its contents.

Complex units for separating liquid waste products from solid waste products of small animals for metabolism studies are disclosed in U.S. Pat. Nos.4,154,196 and 2,684,051 issued to Gass and C. P. Leblond, et al., respectively. Generally these units add a waste collecting apparatus under a conventional habitat, making it larger and unsuitable for hobbyist use. In addition to the conventional wall and foranimous bottom of the animal habitat, these units provide a funnel-like apparatus with its large opening surrounding the entire surface area of the foranimous bottom, thereby channeling the liquid and solid waste from the animal to separate receptacles for liquid waste and solid waste. The waste products are then removed from the receptacles for experimentation. Unfortunately, the small animal is still not allowed a general living area free from the continuous odor of its bodily waste. Moreover, since the funnel that receives the waste is not generally easily removable, the small animal's caretaker, not to be confused with the scientist conducting the experiments, is faced with the dilemma of either quitting their job or subjecting themselves to the sight, smell and feel of the small animal's waste while cleaning the apparatus for collecting such waste.

Therefore, a need exists for a waste depository for small animals that provides a high level of comfort to the small animal by providing a measure of isolation of the animal's waste and debris from the animal's general living area and also provides the animal's caretaker with a convenient and sanitary option for removing the animal's waste.

SUMMARY OF THE INVENTION

Accordingly, it is an object of the present invention to isolate the animal's waste from its general living area.

It is a further object of the present invention to provide a convenient method for removing animal waste from the animal's habitat.

Yet another object of the present invention is to provide an apparatus that will facilitate maintaining a clean and odor-free environment for the small animal.

In one form, the invention includes a surface portion that is accessible by a small animal while the small animal is confined in an animal habitat. The surface portion may be a part of the animal habitat, such as part of a tubular member of a conventional small animal run. Alternatively, the surface portion may be a part of a separate apparatus added to the animal's habitat for waste disposal. The surface portion need not be perforate or foranimous, but has an opening formed therethrough. The opening formed in the surface portion is smaller than the small animal to prevent an inadvertent fall through the opening. The opening is also smaller than the entire surface portion such that there is some solid surface area for the animal to support itself. A container with an opening is located below the surface portion. The opening in the container is removably in communication with the opening in the surface portion such that bodily excrements from the small animal are passed from the small animal through the opening in the surface portion and into the container. Preferably the container is threaded and may be screwed into communication with the opening in the surface portion. Additionally, the container has a plurality of ventilation openings for venting odors from the animal's waste to the exterior of the animal's habitat.

When first used, the container is soiled with some of the small animal's waste by the animal's caretaker. Then the container is placed in the animal's habitat below the surface portion. The initial soiling of the container prompts the small animal, in keeping with its natural instinct to excrete waste away from its eating and sleeping environment, to deposit waste in the container via the opening in the surface portion.

DETAILED DESCRIPTION OF THE PREFERRED EMBODIMENTS

Figure 1:
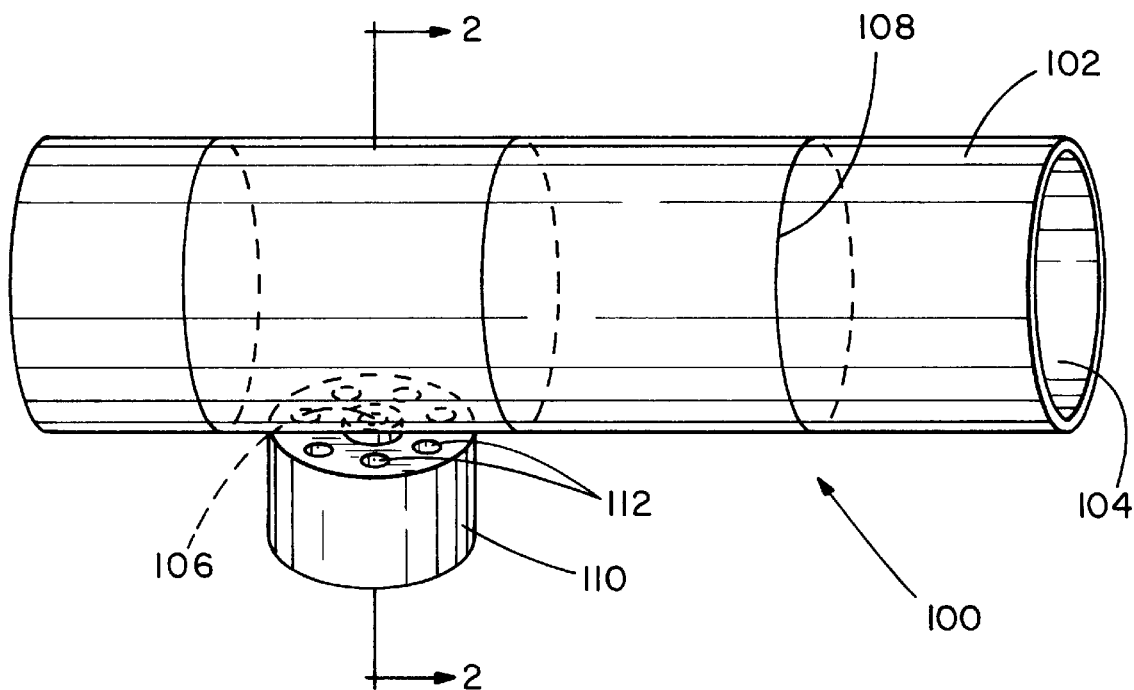
FIG. 1 is a perspective view of one embodiment of a waste depository for small animals made in accordance with the principles of the present invention, wherein the waste depository is an integral part of a tubular animal run.

FIG. 1 is a perspective view of a waste depository for small animals made in accordance with the principles of the present invention. The waste depository is an integral part of a tubular member 100, which may be added to a conventional animal run (not shown). Tubular member 100 is oriented horizontally when connected to an animal run, such that gravity assists in directing the animal's waste into the waste depository. Preferably, tubular member 100 is transparent. Tubular member 100 has an outer surface 102 and an inner surface 104. Formed integrally within inner surface 104 are protrusions 108, which assist the small animal in traveling through the animal run. An opening 106 is formed through the tubular member 100 extending from inner surface 104 to outer surface 102. Opening 106 is small in relative comparison to inner surface 104. A container 110 is shown attached to tubular member 100 such that container 110 is in communication with opening 106. Provided on a top surface of container 110 are ventilation holes 112. Ventilation holes 112 allow any odors in container 110 to vent generally exterior to tubular member 100.

Figure 2:
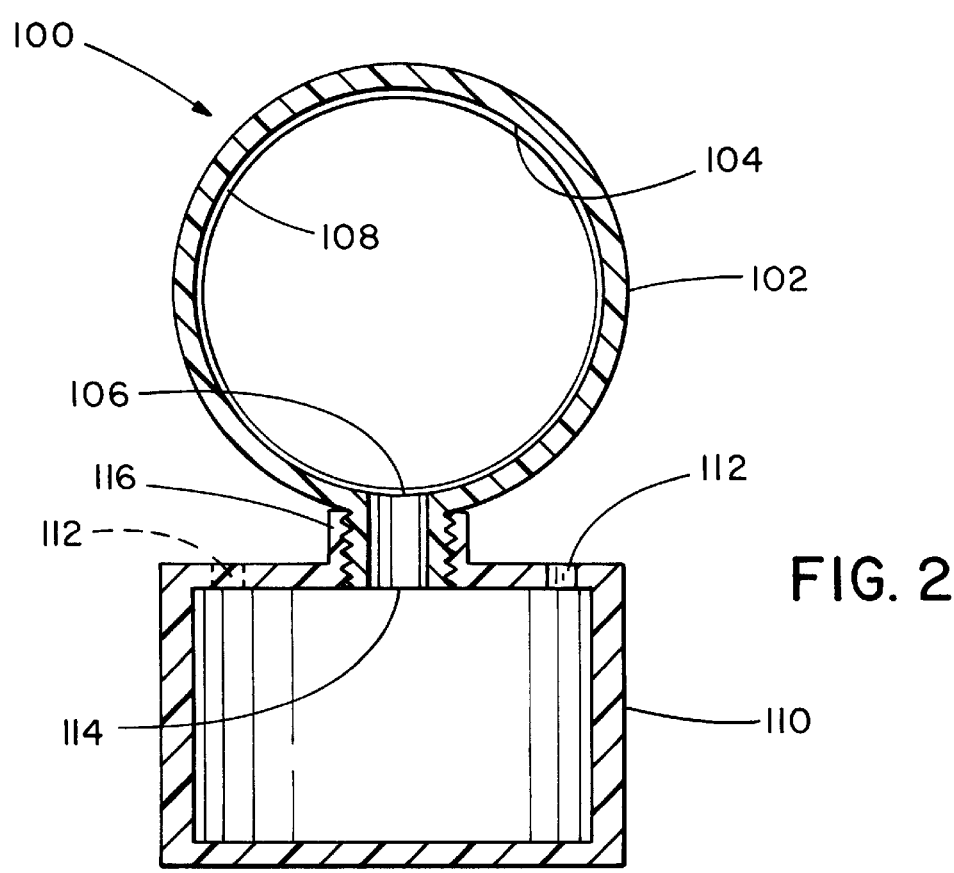
FIG. 2 is a cross-sectional view of the waste depository shown in FIG. 1 taken along the line 2—2.

FIG. 2 is a cross-sectional view of the waste depository shown in FIG. 1 taken along the line 2—2. As best seen in FIG. 2, container 110 is threaded and screwed on to a protrusion 116 of tubular member 100 such that opening 106 is in communication with an opening 114 in container 110. The openings 106, 114 provide a channel extending from inner surface 104 into an interior area of container 110.

Figure 3:
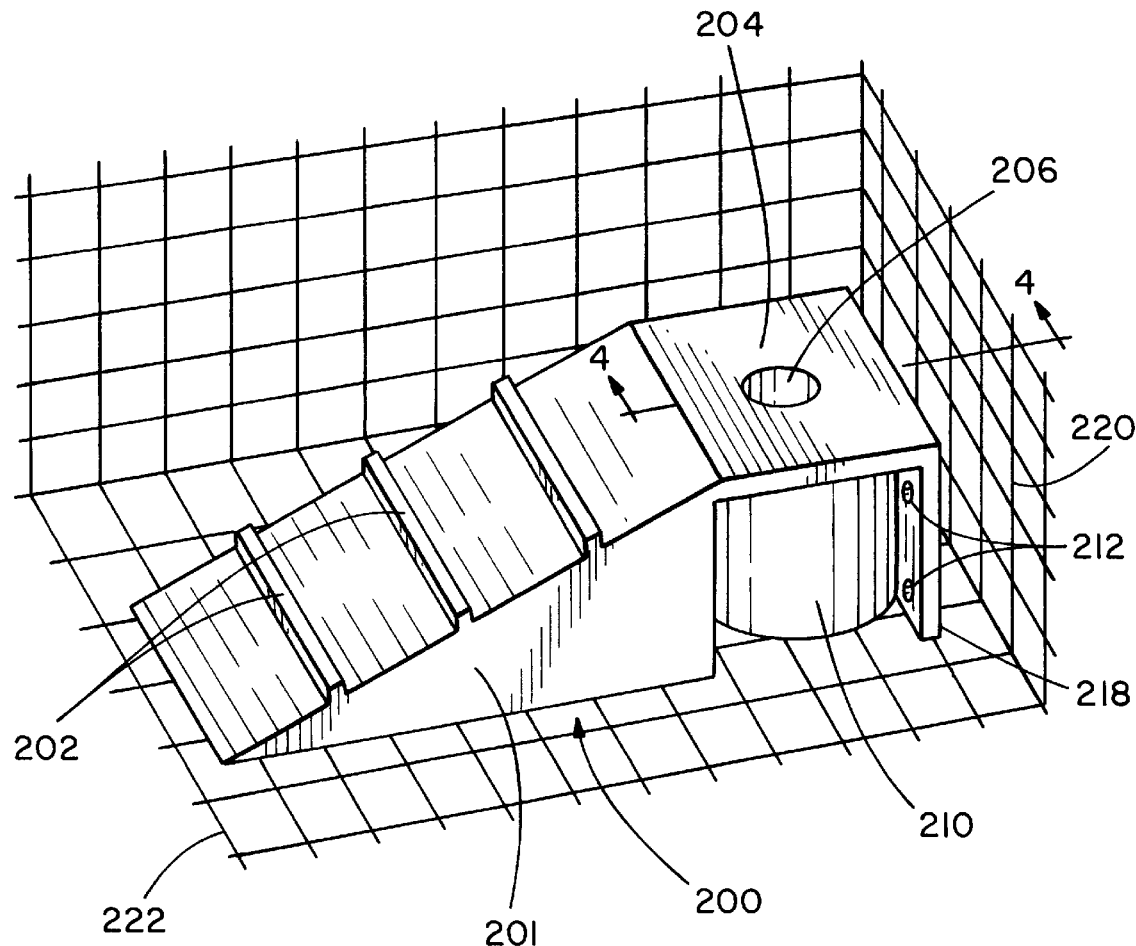
FIG. 3 is a perspective view of another embodiment of a waste depository for small animals made in accordance with the principles of the present invention, wherein the waste depository is a separate stand-alone apparatus added to the small animal's habitat.

FIG. 3 shows another embodiment of a waste depository made in accordance with the principles of the present invention. The waste depository 200 is a stand-alone apparatus that may be added to a small animal's habitat. FIG. 3 shows waste depository 200 resting on a perforate bottom portion 222 adjacent a wall section 220 of an animal's habitat. The bottom need not be perforate since waste is deposited in waste depository 200.

The waste depository 200 has a ramp portion 201 that may be traversed by the small animal. The ramp has protrusions 202 to assist the small animal in traversing from the bottom 222 of its habitat up to a surface portion 204 of waste depository 200. Formed through the surface portion 204 is an opening 206. The opening 206 is smaller than the small animal and does not cover the entire surface of surface portion 204. Below the surface portion 204 is a container 210 having an opening in communication with opening 206. Container 210 need not be attached to the surface portion 204 but may simply rest on the bottom 222 of the animal's habitat. Preferably the container 210 is transparent for determining the volume of its contents. Ventilation openings 212 are formed in a rear support 218 of waste depository 200. Notably, the waste depository 200 is placed in the animal's habitat such that ventilation openings 212 are directly adjacent wall 220.

Figure 4:
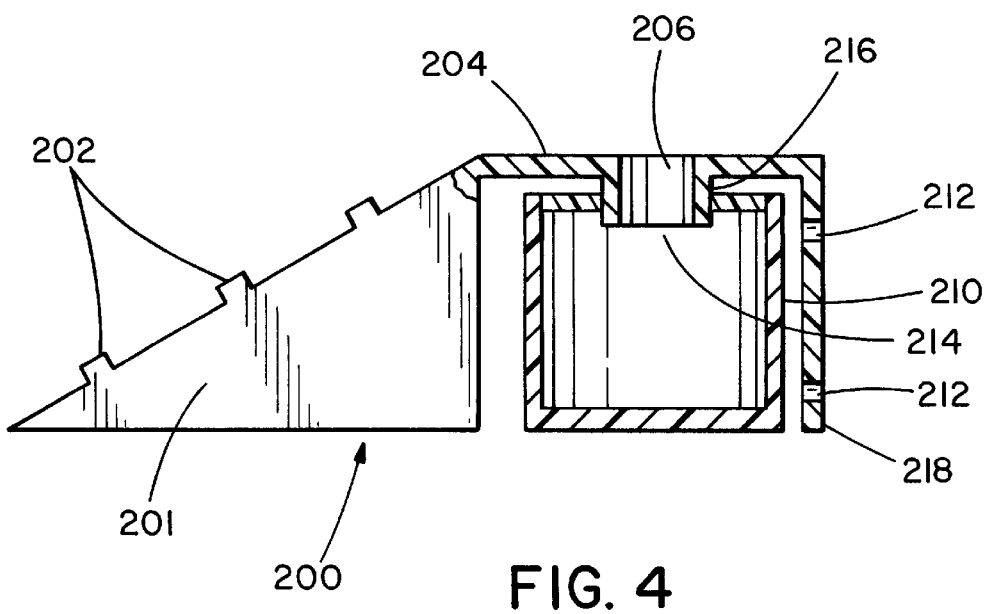
FIG. 4 is a cross-sectional view of the waste depository shown in FIG. 3 taken along the line 4—4.

FIG. 4 is a cross-sectional view of the waste depository 200 shown in FIG. 3 with the cross-sectional view taken along line 4—4. As best seen in FIG. 4, the opening 206 in the surface portion 204 is formed by protrusion 216 which extends downwardly from the surface portion 204. An opening 214 in container 210 is in open communication with the opening 206 in the surface portion 204. Therefore, a channel is formed extending from surface portion 204 into container 210.

The operation of the waste depository is fairly automatic for the caretaker with the small animal's basic instincts taking over after initial prompting. The caretaker initially prompts the small animal by placing a small amount of the small animal's waste in container (110, 210) before putting the waste depository into service. With an otherwise clean living environment and the odor of its waste emanating from the waste depository, the small animal is prompted and does deposit its waste into the opening (106, 206) in the surface portion, allowing the waste to be collected in the container (110, 210). In the embodiment shown in FIG. 1, ventilation holes 112 allow fast drying of the waste in the container 110 and also provide a path for odors to escape that is generally exterior to the animal's habitat. In the embodiment shown in FIG. 3, ventilation holes 212 in rear support 218 serve a similar function as ventilation holes 112. The caretaker simply removes the container for cleaning or disposal when the container is sufficiently full. The isolation of the animal's waste from its general living area provided by the present invention provides a high level of comfort to the small animal. Additionally, the animal's caretaker is provided with a convenient means for removing the animal's waste.

While the present invention has been described with respect to preferred embodiments, it should be understood that various modifications can be made to the invention without departing from the spirit of the invention or the scope of the appended claims.

What is claimed is:

1. A method for collecting waste in a waste depository for small animals comprising the steps of:

(A) providing a waste depository comprising:
   a surface portion accessible to a small animal while the small animal is confined in an animal habitat, said surface portion having an opening formed therethrough, said opening being smaller than the small animal; and
   a container located below said surface portion having an opening that is removably in communication with said opening in said surface portion such that bodily excrements from the small animal are passed from the small animal into said container;

(B) placing a small amount of the small animal's waste in the waste depository; and (C) allowing the small animal to peruse the surface portion of the waste depository, whereby the small animal is prompted to deposit its waste in the waste depository.

2. The method of claim 1 further comprising the step of (D) removing the waste depository from the surface portion.

3. The method of claim 2 further comprising the steps of (E) cleaning the waste depository; and (F) returning the waste depository to a position below the surface portion such that the opening in the surface portion is in communication with the waste depository.

4. The method of claim 2 further comprising (E) placing a different waste depository under the surface portion such that the opening in the surface portion is in communication with the different waste depository.

5. A waste depository for small animals comprising:

a tubular member having an outer surface and an inner surface defining a tubular wall, said inner surface being accessible to a small animal, said inner surface and outer surface having an opening formed therethrough, said opening being smaller than the small animal; and a container releasably attachable to said outer surface of said tubular member below said tubular member, said container having an opening that is in communication with said opening in said tubular member, wherein said openings in said tubular member and said container are freely in communication and devoid of any structure such that bodily excrements from a small animal in said tubular member may be passed from the small animal into said container.

6. The waste depository of claim 5 wherein said container is threaded and may be screwed onto said outer surface of said tubular member.

7. The waste depository of claim 5 wherein said container further comprises a plurality of ventilation holes.

8. The waste depository of claim 5 wherein said container is transparent.

9. A waste depository for small animals comprising:

a surface portion having an opening formed therethrough, said opening being smaller than a small animal;

a ramp portion extending from a bottom surface of an animal habitat to said surface portion;

a support member supporting said surface portion above the bottom surface of the animal habitat;

a container having an opening, said opening of said container being removably in communication with said opening in said surface portion such that bodily excrements from a small animal on said surface portion may pass to said container, said container housing bodily excrements from the small animal when first placed into use.

10. The waste depository of claim 9 wherein said ramp portion has a plurality of protrusions.

11. The waste depository of claim 9 wherein said container is transparent.

12. The waste depository of claim 9 wherein said support member has a plurality of ventilation holes.

* * * * *